United States Patent [19]

Ando

[11] Patent Number: 5,036,185
[45] Date of Patent: Jul. 30, 1991

[54] OPTICAL APPARATUS FOR DETECTING A FOCUSING STATE

[75] Inventor: Hideo Ando, Kanagawa, Japan

[73] Assignee: Kabushiki Kaisha Toshiba, Kanagawa, Japan

[21] Appl. No.: 456,427

[22] Filed: Dec. 26, 1989

[30] Foreign Application Priority Data

| Dec. 27, 1988 | [JP] | Japan | 63-327580 |
| Dec. 27, 1988 | [JP] | Japan | 63-327582 |
| Dec. 27, 1988 | [JP] | Japan | 63-327583 |
| Dec. 27, 1988 | [JP] | Japan | 63-327584 |

[51] Int. Cl.$^5$ .............................................. G01J 1/20
[52] U.S. Cl. ..................... 250/201.5; 369/44.23; 369/44.24
[58] Field of Search ............... 250/201.5, 201.4, 201.2; 369/44.23, 44.24

[56] References Cited

U.S. PATENT DOCUMENTS

| 4,023,033 | 5/1977 | Bricot et al. | |
| 4,079,248 | 3/1978 | Lehureau et al. | |
| 4,441,175 | 4/1984 | Shuman | 369/44.24 |
| 4,604,739 | 8/1986 | Cohen | 250/201.5 |
| 4,709,139 | 11/1987 | Nakamura et al. | 250/201.5 |
| 4,731,527 | 3/1988 | Nomura et al. | 369/44.23 |
| 4,812,638 | 3/1989 | Ogata et al. | 250/201.5 |
| 4,816,665 | 3/1989 | Hsu | 369/44.23 |

FOREIGN PATENT DOCUMENTS 51-141651 12/1976 Japan .
59-90237 5/1984 Japan .

*Primary Examiner*—David C. Nelms
*Attorney, Agent, or Firm*—Finnegan, Henderson, Farabow, Garrett and Dunner

[57] ABSTRACT

A light detecting apparatus including a portion for receiving light with a predetermined light pattern, a first element for extracting part of the received light in reference to the light pattern, a second element for reshaping the light pattern of the received light and a photodetecting element on which the received light is projected.

23 Claims, 8 Drawing Sheets

OPTICAL APPARATUS FOR DETECTING A FOCUSING STATE

FIELD OF THE INVENTION

The present invention relates generally to a light detecting apparatus, and more particularly to a light derecting apparatus which can be applied to an optical information reproducing apparatus.

BACKGROUND OF THE INVENTION

Recently, optical discs have been used in many fields as information recording media. The advances in laser oscillator technology have contributed to optical discs having superior high density and high speed characteristics. Information is recorded on these discs in the form of a series of pits and the change in reflectivity of light irradiated onto the disc is used in order to read the recorded information. However, when executing the recording and reading of information on the disc, a focus servo is required for the control of the irradiated light so that it can be accurately focussed on the optical disc. In the past, various methods have been devised for detecting focus in order to operate this focus servo.

For instance, as disclosed in the Japanese Laid-Open Patent Application 59-90237, there is shown a device which performs the detection of focussing errors by detecting the light from an optical disc via a knife wedge masking plate provided in the optical path which provides extraction asymmetrically about the optical axis using a photo detector. In this detection method, the focus servo operates by detecting the focal point using the fluctuation of the position of the light reflected from the optical disc to the photo detector due to the distance between the optical disc and the objective lens. In this device, the photo detector is located at the image formation point of the light reflected from the optical disc. This photo detector has two photo detecting elements.

For another instance, in the Japanese Laid-Open Patent Application 51-141651, there is shown a device in which light from an optical disc is irradiated onto a photo detector, which is divided into four parts, with these parts combined in a square, via a cylindrical lens which generates astigmatism. This photo detector performs detection of focussing errors and generates focus error signals and reading information according to the area of light irradiated. In this detection method, the photo detector is located at the position of the minimum light spot formed between two focal lines which are formed in the direction of the generatrix generated by the cylindrical lens and the direction orthogonal to that generatrix. Detection of focussing errors signals and reading of information are carried out by the same photo detector.

However, in detecting the focal point using the detection method according to the Japanese Laid-Open Patent Application 59-90237, the size of the beam spot of light on the light detecting apparatus becomes small because the photo detector is positioned at the image formation point of the light from the optical disc. For this reason, it is liable to be affected by light axis divergency and the like due to deformation of the optical elements through temperature changes and the like. Thus, there is the disadvantage that accurate focussing control cannot be executed.

In the case of detection using the detection method according to the Japanese Laid-Open Patent Application 51-141651, although focussing error detection and reading information can be executed by the same photo detector, since this photo detector is arranged at the position of the minimum light spot formed between two focal lines generated by the cylindrical lens, accurate detection cannot be performed due to the influence of diffraction of the light.

SUMMARY OF THE INVENTION

It is, therefore, an object of the present invention to provide a light detecting apparatus capable of accurate focal point detection without being affected by light axis divergency and the like due to temperature changes and the like.

In order to achieve the above object, a light detecting apparatus according to one aspect of the present invention includes a portion for receiving light with a predetermined light pattern, a first element for extracting part of the received light in reference to the light pattern, a second element for reshaping the light pattern of the received light and a photo-detecting element on which the received light is projected.

In order to achieve the above object, a light detecting apparatus according to another aspect of the present invention includes a portion for receiving light with a predetermined light pattern, a first element for reshaping the light pattern of the received light in a first direction, a second element for reshaping the light pattern of the received light in a second direction which is asymmetrical with the first direction and a photo-detecting element on which the received light is projected.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
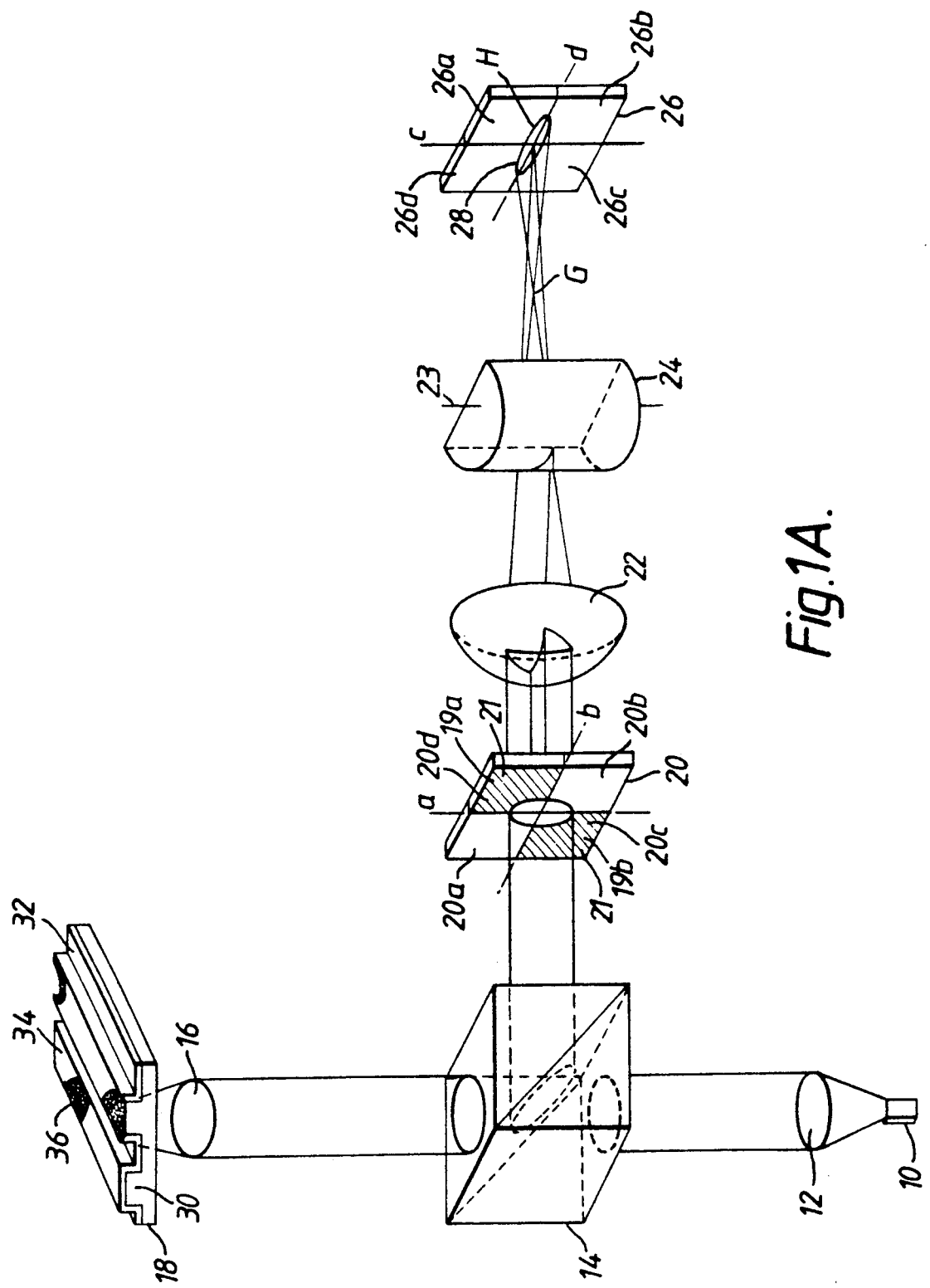
FIG. 1A is a schematic drawing showing a first embodiment of the light detecting apparatus according to the present invention.

The present invention will be described in detail with reference to the FIGS. 1 through 13. Throughout the drawings and this description, like or equivalent reference numerals or letters have been used to designate like or equivalent elements for simplicity of explanation.

Referring now to FIG. 1A, a first embodiment of the light detecting apparatus according to the present invention will be described in detail.

In FIG. 1A, the light detecting apparatus comprises a light source 10 such as a semiconductor laser, a collimator lens 12 which converts the light from light source 10 into a parallel beam, a beam splitter 14, an objective lens 16 which condenses the light onto an information recording medium such as an optical disc 18, a partial light extracting element such as a light pattern defining mask 20 onto which the light reflected from information recording medium 18 is irradiated, a converging lens 22 for converging the light, a light pattern reshaping element such as a cylindrical lens 24 and a photo detector 26 which detects the light reflected from information recording medium 18.

Figure 2:
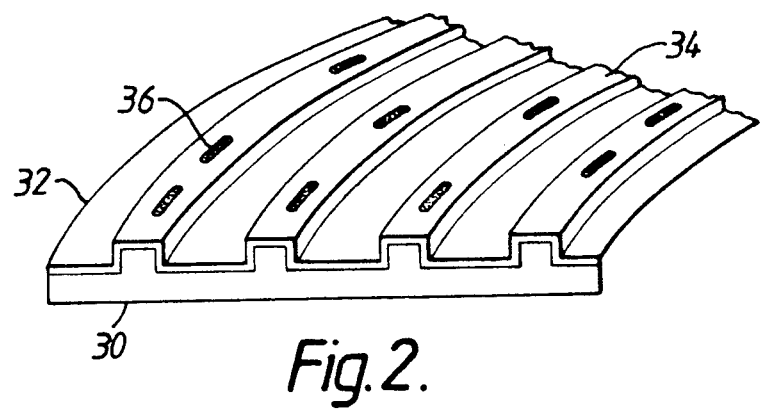
FIG. 2 is partial perspective view of an optical disc to which the light detecting apparatus is provided for reading optical record information.

When forcusing is performed using this light detecting apparatus, the light output from light source 10 is converted into a parallel beam by collimator lens 12. The light converted into a parallel beam passes through beam splitter 14 towards objective lens 16 and, after being further condensed by objective lens 16, is irradiated onto information recording medium 18. Information recording medium 18 is a so-called optical disc. For instance, as shown in FIG. 2, it is composed of substrate 30 and recording film 32 on which information is recorded. Substrate 30 is composed of plastic, glass, aluminium, or the like. Recording film 32 is composed of a metal film, a semi-metallic film, an inorganic film or an organic film. Recording track 34 is formed beforehand in a raised and indented state on substrate 30 and recording film 32 in concentric circles or in a spiral form.

Information pits 36 are formed along recording track 34.

There are various methods of recording information on this optical disc 18. Such methods include pit formation by irradiating light onto recording film 32 and evaporating this recording film 32, bubble formation by causing recording film 32 to bulge, or the method of causing chemical change without causing physical change to recording film 32.

The light irradiated onto optical disc 18 is reflected by optical disc 18 and passes once more towards objective lens 16. After being transmitted through objective lens 16, the light is irradiated onto beam splitter 14. The light irradiated onto beam splitter 14 is led toward light pattern defining mask 20 and is transmitted through light pattern defining mask 20 and irradiated onto photo detector 26 via converging lens 22 and cylindrical lens 24. The light irradiated onto light pattern defining mask 20 has an uneven light quantity distribution through the influence of interference of the light reflected from the pits on optical disc 18 and the light from their surroundings.

Figure 3:
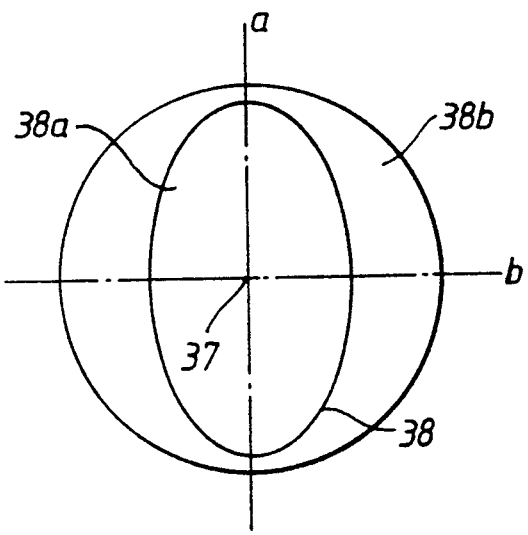
FIG. 3 is a schematic diagram showing a reflected light pattern from the optical disc.

FIG. 3 depicts in the light quantity distribution in the plane orthogonal to light axis 37 of the light irradiated onto light pattern defining mask 20. The light quantity slightly decreases in inner area 38a inside boundary line 38 near light axis 37, but greatly decreases in outer area 38 far from light axis 37. Thus, the inner area 38a is brighter than the outer area 38b. The pattern of inner area 38a formed along boundary line 38 is formed symmetrically along the direction of recording track 34 of optical disc 18. Moreover, for the direction orthogonal to that of recording track 34 of optical disc 18, the pattern of inner area 38a is also symmetrical to this boundary line 38.

The positional relationship of the optical system of light pattern defining mask 20, converging lens 22 and cylindrical lens 24 will now be explained, taking the direction along recording track 34 as the a axis and the direction orthogonal to the direction along recording track 34 as the b axis.

Figure 4A:
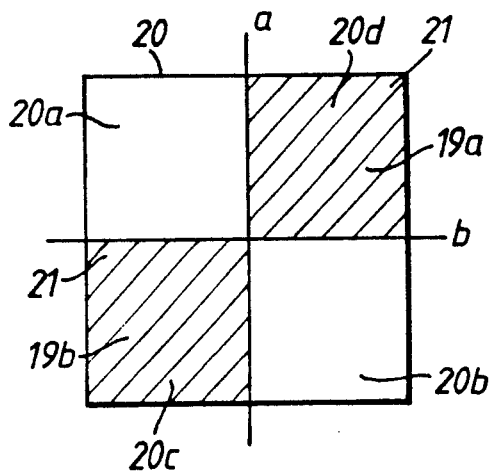
FIG. 4A is a plan view of an example of a light pattern defining mask of FIG. 1A.

Light pattern defining mask 20 has first and second areas 19a and 19b which are arranged in the direction parallel with the generatrix direction 23 of cylindrical lens 24 which is described in detail later, as shown in FIG. 4A. First area 19a defines a light transmitting portion 20a and a light masking portions 20c along the direction of first area 19a. Second area 19b defines a light transmitting portion 20b and light masking portions 20d which are orthogonal to light transmitting portion 20a and light masking portions 20c of first area 19a. Also, light masking portions 20c and 20d are each asymmetric about the axis and the b axis, and each portion is formed on each of first and second areas 19a and 19b along the a axis. Light masking film 21 is provided on light masking portions 20c and 20d. Light masking film 21 may comprise, for instance, aluminium film, chrome film, carbon film, or multi layer films formed of such inorganic substances as the oxide or nitride of indium. Among these, when a carbon film or a multi layer film which is a light absorbing material is used, the reflection by light masking film 21 is small, and therefore it is effective from the viewpoint of producing hardly any stray light in the optical system. If light masking film 21 reflects a tolerable amount of light, the reflected light makes undesired pits on optical disc 18. Further the reflected light from light masking film 21 is again routed to photo detector 26 through reflection by optical disc 18 so that the detecting operation of photo detector 26 is disturbed.

Such objects for preventing undesired pits and the disturbance against the detecting operation of photo detector 26 are also accomplished by inclining the plane of light pattern defining mask 20 to light axis L of the light.

Figure 4B:
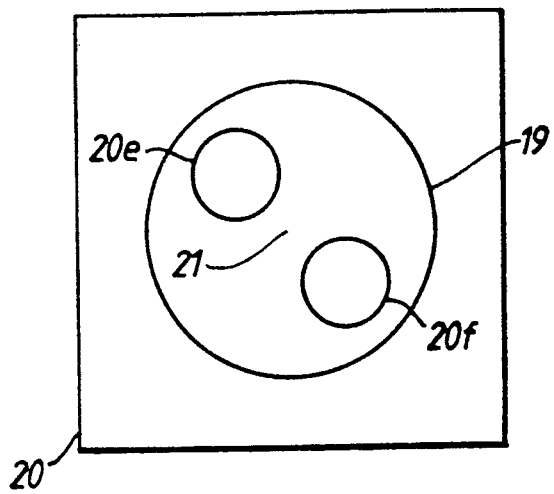
FIG. 4B is a plan view of another example of the light pattern defining mask of FIG. 1A.

Light pattern defining mask 20 can be composed as shown in FIG. 4B. That is, light pattern defining mask 20 has light transmitting portions 20e and 20f which transmit the light irradiated onto light pattern defining mask 20. Light transmitting portions 20e and 20f are provided inside spot 19 of the light irradiated onto light pattern defining mask 20, and they both have approximately the same areas with circular patterns. These light transmitting portions 20e and 20f are formed so that light transmitting portion 20e and light transmitting portion 20f with their circular patterns are symmetrical about light axis L of the light irradiated onto light pattern defining mask 20.

When the light led from beam splitter 14 is irradiated onto light pattern defining mask 20, as shown in FIGS. 4A and 4B, the light irradiated onto light transmitting portions 20a and 20b (FIG. 4A) or 20e and 20f (FIG. 4B) passes through light pattern defining mask 20 and is led to a light condensing element such as a converging lens 22, as shown in FIG. 1A. The light condensing element, e.g., converging lens 22 has the function of evenly condensing the irradiated light on photo detector 26. If the light passing through light pattern defining mask 20 and cylindrical lens 24 is sufficiently condensed a thin beam, the light condensing element, e.g., converging lens 22 can be removed.

The light which has passed through converging lens 22 is irradiated onto cylindrical lens 24. Cylindrical lens 24 generates focal lines on which the light is condensed in the direction of its generatrix 23 and the direction orthogonal to its generatrix 23 respectively, and introduces astigmatism to the light. Cylindrical lens 24 is positioned so that generatrix direction 23 is parallel to the a axis. The light which has passed through cylindrical lens 24 is condensed in the same direction as before irradiation onto cylindrical lens 24, without being affected by the action of cylindrical lens 24 in the generatrix direction 23, and is condensed at focal point H. However, it is affected by the action of cylindrical lens 24 in the direction orthogonal to the generatrix direction 23 and is condensed at focal point G, which is a shorter distance from generatrix 23.

The light which has passed through cylindrical lens 24 which has these light condensing properties is irradiated onto photo detector 26, which is positioned at focal point H. Photo detector 26 is composed of four photo detecting cells 26a, 26b, 26c and 26d, and each cell has the same degree of photo detecting property. Photo detecting cells 26a, 26b, 26c and 26d are positioned so that each is in contact with the c axis, which is set parallel to the a axis, and with the d axis, which is set parallel to the b axis, and photo detector 26 is a combination of these cells in a square. Since the image on photo detector 26 is positioned at an image formation point corresponding to the image on optical disc 18, it hardly undergoes any diffraction of light.

Next, the methods of focussing error detection, tracking error detection and the detection of information read from optical disc 18 in a photo detecting apparatus provided with the above construction are explained.

Figure 5A:
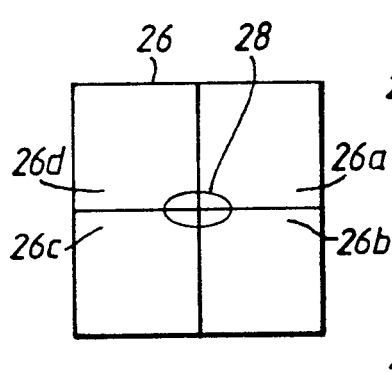
FIGS. 5A, 5B and 5C are explanatory diagrams showing the operation of the light detecting apparatus according to the light pattern defining mask of FIG. 4A.

First, the method of focussing error detection using light pattern defining mask 20, as shown in FIG. 4A, will be described with reference to FIGS. 5A, 5B and 5C. In a photo detecting apparatus which has light pattern defining mask 20, as shown in FIG. 4A, if the light irradiated from objective lens 16 onto optical disc 18 is in a focussed state, the pattern of beam spot 28 on photo detector 26 is as shown in FIG. 5A.

When in the focussed state, the light from optical disc 18 which has passed through light transmitting portion 20a of light pattern defining mask 20 is irradiated onto photo detecting cells 26a and 26b of photo detector 26. The quantities of light irradiated onto photo detecting cells 26a and 26b are approximately equal and also take a pattern which has a certain degree of width in the d axis direction. Also, in the same way, the light which has passed through light transmitting portion 20b is irradiated onto photo detecting cells 26c and 26d of photo detector 26. The quantities of light irradiated onto photo detecting cells 26c and 26d are also approximately equal and also take a pattern which has a certain degree of width in the d axis direction.

Figure 5B:
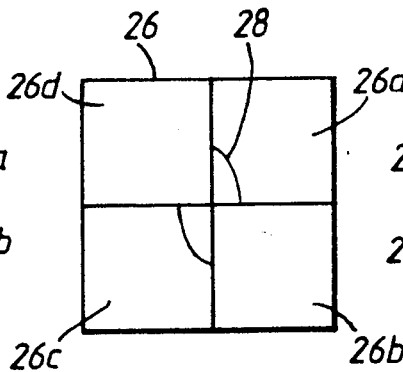

When optical disc 18 is closer to objective lens 16 than when in the focussed state, the pattern of beam spot 28 becomes as shown in FIG. 5B. That is to say, in the case of the light which has passed through light transmitting portion 20a of light pattern defining mask 20, the focal point position in the direction orthogonal to generatrix direction 23 is closer to photo detector 26 than focal point position G when focussed.

Consequently, the width of beam spot 28 on photo detector 26 becomes narrower in the d axis direction. Moreover, concerning generatrix direction 23, light is irradiated onto photo detecting cell 26a of photo detector 26 in a state in which the width of beam spot 28 has become wider. In the same way, in the case of the light which has passed through light transmitting portion 20b also, the focal point position in the direction orthogonal to generatrix direction 23 is closer to photo detector 26 than focal point position G when focussed, and the width of beam spot 28 becomes narrower in the d axis direction. Moreover, concerning generatrix direction 23, the light is irradiated onto photo detecting cell 26c of photo detector 26 in a state in which the width of beam spot 28 has become wider.

Figure 5C:
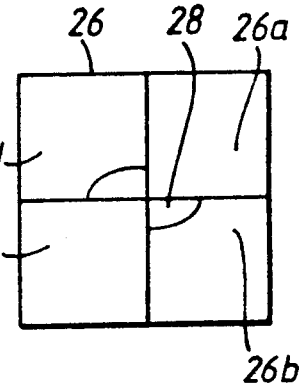

If optical disc 18 is farther away from objective lens 16 than when in the focussed state, the pattern of beam spot 28 becomes as shown in FIG. 5C. In the case of the light which has passed through light transmitting portion 20a of light pattern defining mask 20, the focal point position in the direction orthogonal to generatrix direction 23 is farther from photo detector 26 than focal point position G when focussed. Consequently, the width of beam spot 28 on photo detector 26 becomes wider in the d axis direction. Moreover, concerning generatrix direction 23, since the light is irradiated onto photo detector 26 after it has been condensed, as opposed to the case when optical disc 18 was closer, the beam spot shifts to the opposite side with regard to the d axis and is irradiated onto photo detecting cell 26b of photo detector 26.

In the same way, in the case of the light which has passed through light transmitting portion 20b also, the focal point position in the direction orthogonal to generatrix direction 23 is farther from photo detector 26 than focal point position G when focussed. Consequently, the width of beam spot 28 on photo detector 26 becomes wider in the d axis direction. Moreover, concerning generatrix direction 23, since the light is irradiated onto photo detector 26 after it has been condensed, as opposed to the case when optical disc 18 was closer, the beam spot shifts to the opposite side with regard to the d axis and is irradiated onto photo detecting cell 26d of photo detector 26.

In other words, if the pattern of beam spot 28 on photo detector 26 when optical disc 18 is at the focal point position for objective lens 16 is taken as the standard, in the case when the disc is either closer or farther away the beam spot is shifted to opposite sides on photo detector 26 with regard to the d axis.

Figure 5D:
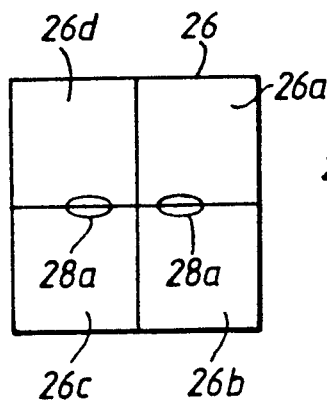
FIGS. 5D, 5E and 5F are explanatory diagrams showing the operation of the light detecting apparatus according to the light pattern defining mask of FIG. 4B.

Now, methods of focussing error detection using the light pattern defining mask 20, as shown in FIG. 4B, will be described with reference to FIGS. 5D, 5E and 5F. In a photo detecting apparatus which has the structure described above, in the case of light irradiated from objective lens 16 onto optical disc 18 being in a focussed state, the patterns of beam spots 28a and 28b on photo detector 26 are as shown in FIG. 5D. That is to say, when in the focussed state, the light from optical disc 18 which has passed through light transmitting portion 20e of light pattern defining mask 20 is irradiated onto photo detecting cells 26a and 26b of photo detector 26.

The quantities of light irradiated onto photo detecting cells 26a and 26b are approximately equal and also take the form of approximately oval-patterned beam spot 28a which has a certain degree of width in the d axis direction. Also, in the same way, the light which has passed through light transmitting portion 20f is irradiated onto photo detecting cells 26c and 26d of photo detector 26. The quantities of light irradiated onto photo detecting cells 26c and 26d are approximately equal and also take the form of approximately oval-patterned beam spot 28b which has a certain degree of width in the d axis direction.

Figure 5E:
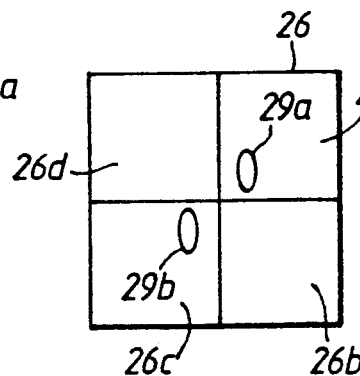

When optical disc 18 is closer to objective lens 16 than when in the focussed state, the patterns become as shown in FIG. 5E. That is to say, in the case of the light which has passed through light transmitting portion 20e of light pattern defining mask 20, the focal point position in the direction orthogonal to generatrix direction 23 is closer to photo detector 26 than focal point position G when focussed. Consequently, the width of beam spot 29a on photo detector 26 becomes narrower in the d axis direction. Moreover, in the c axis direction, light is irradiated onto photo detecting cell 26a of photo detector 26 in a state in which the width of beam spot 29a has become wider.

In the same way, in the case of the light which has passed through light transmitting portion 20f also, the focal point position in the direction orthogonal to generatrix direction 23 is closer to photo detector 26 than focal point position G when focussed, and the width of beam spot 29b becomes narrower in the d axis direction. Moreover, in the c axis direction, the light is irradiated onto photo detecting cell 26c of photo detector 26 in a state in which the width of beam spot 29b has become wider.

Figure 5F:
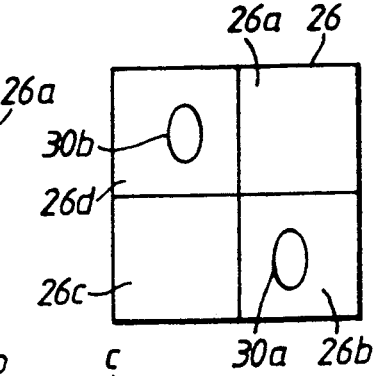

When optical disc 18 is farther away from objective lens 16 than when in the focussed state, the beam spots become as shown in FIG. 5F. In the case of the light which has passed through light transmitting portion 20e of light pattern defining mask 20, the focal point position in the direction orthogonal to generatrix direction 23 is father from photo detector 26 than focal point position G when focussed. Consequently, the width of beam spot 30a on photo detector 26 becomes wider in the d axis direction. Moreover, in the c axis direction 23, since the light is irradiated onto photo detector 26 after it has been condensed, as opposed to the case when optical disc 18 is closer, beam spot 30a shifts to the opposite side with regard to the d axis and is irradiated onto photo detecting cell 26b of photo detector 26.

In the same way, in the case of the light which has passed through light transmitting portion 20f also, the focal point position in the direction orthogonal to generatrix direction 23 is farther from photo detector 26 than focal point position G when focussed. Consequently, the width of beam spot 30b on photo detector 26 becomes wider in the d axis direction. Moreover, in c axis direction 23, since the light is irradiated onto photo detector 26 after it has been condensed, as opposed to the case when optical disc 18 was closer, beam spot 30b shifts to the opposite side with regard to the d axis and is irradiated onto photo detecting cell 26d of photo detector 26.

In other words, if the patterns of beam spots 28 on photo detector 26 when optical disc 18 is at the focal position for objective lens 16 are taken as the standard, in the case when the disc is either closer or farther away, the beam spots are shifted to opposite sides on photo detector 26 with regard to the d axis.

Figure 6:
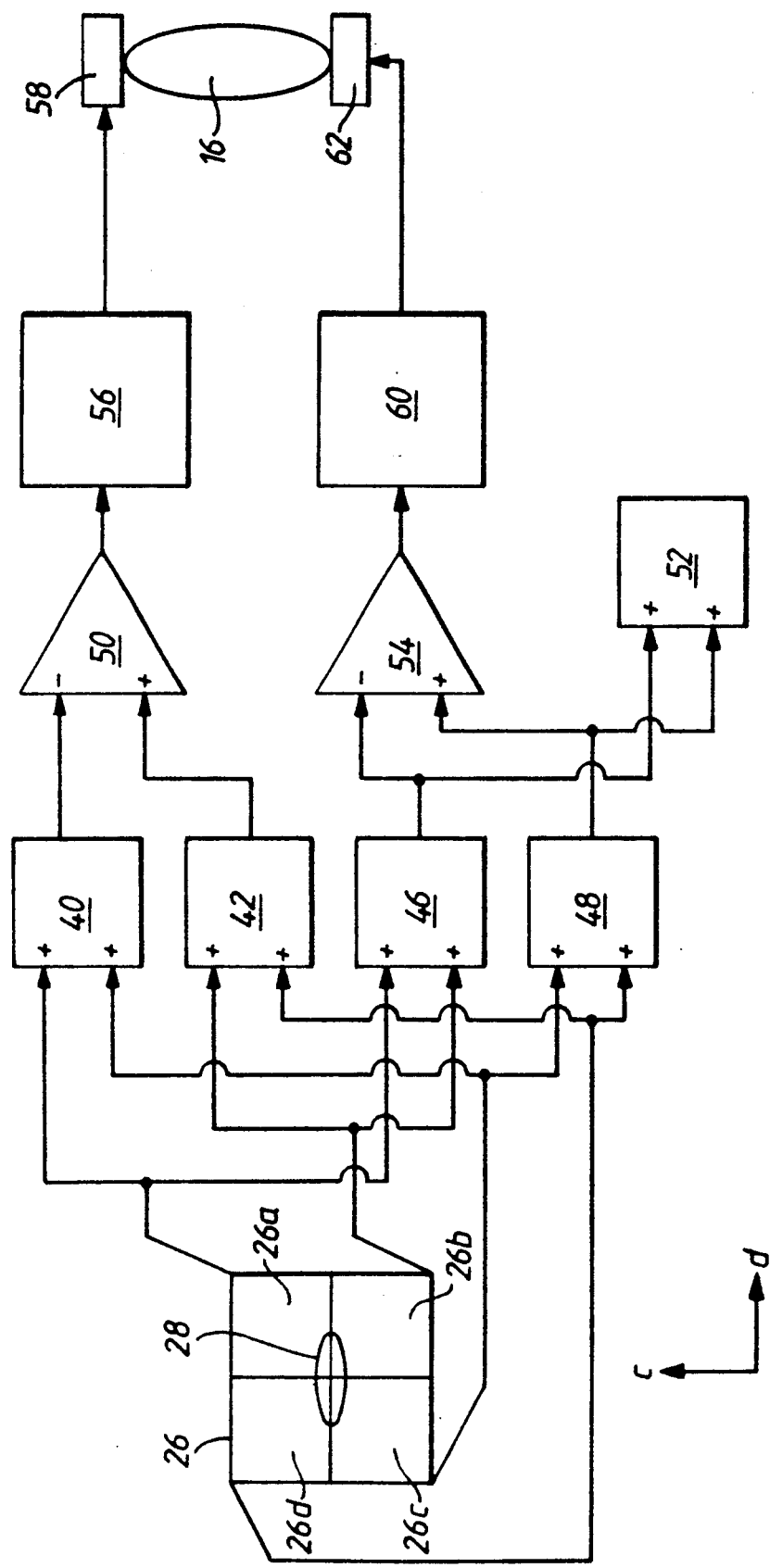
FIG. 6 is a block diagram showing a signal processing circuit for processing detected signals from a photo detector of FIG. 1A.

As described above, the pattern of beam spot 28 irradiated onto photo detector 26 changes depending on the positional relationship between optical disc 18 and objective lens 16. A focussing error signal is generated by the detection of this pattern. The composition of the signal processing circuit which generates this focussing error signal is shown in FIG. 6.

The output signals of photo detecting cells 26a and 26c are added by adder 40, and the output signals of photo detecting cells 26b and 26d are added by adder 42. The focussing error signal can be obtained by subtracting the signals obtained by adder 40 and adder 42 using subtractor 50. This focussing error signal is supplied to objective lens drive circuit 56, and, by controlling objective lens drive unit 58, objective lens 16 is shifted in the light axis direction and focussing is executed. In this way, since generation of the focus signal is performed by comparing the sum of the signals of photo detecting cells 26a and 26c with the sum of the signals of photo detecting cells 26b and 26d, a forcusing error can be detected, even if beam spot 28 is shifted in the direction of the c axis or the d axis due to light axis divergency or the like.

Also, when detecting tracking error, the position in which (1) the direction along recording track 34 of optical disc 18, (2) generatrix direction 23 of cylindrical lens 24 and (3) the c axis direction of photo detector 26 are in agreement with each other is taken. When detecting tracking error, the change in the diffraction distribution of the light reflected from optical disc 18 is used through the relative relationship between the irradiating light irradiated onto optical disc 18 and the direction along recording track 34 to determine a tracking error.

When the center of the beam of irradiated light is on the centerline of recording track 34, the light which irradiates onto photo detector 26 is symmetrical about the c axis of photo detector 26. That is to say, equal quantities of light are irradiated onto each of photo detecting cells 26a and 26b, 26c and 26d. As opposed to this, when the beam of irradiated light slips from the centerline of recording track 34, the light which irradiates onto photo detector 26 becomes asymmetrical about the c axis of photo detector 26. That is to say, differing light quantities are irradiated onto photo detecting cells 26a and 26b, 26c and 26d.

In the case of the irradiated light, the output signals of respective photo detecting cells 26a and 26b are added by adder 46, and the output signals of photo detecting cells 26c and 26d are added by adder 48. The output signals of adders 46 and 48 are output signals corresponding to the light quantities irradiated onto photo detecting cells 26a and 26b and onto photo detecting cells 26c and 26d, respectively. By taking their difference using subtractor 54, a tracking error signal can be obtained which corresponds to the difference in the light quantities irradiated onto photo detecting cells 26a and 26b and onto photo detecting cells 26c and 26d.

A tracking servo is operated by supplying this tracking error signal to objective lens driving circuit 60 and driving objective lens 16 by controlling driving unit 62. In this way, by using a neighbouring relationship such as that of photo detecting cells 26c and 26d to photo detecting cells 26a and 26b, even if, for instance, the light which has passed through objective lens 16 from recording track 34 on optical disc 18 has slipped, tracking error detection can be executed without any error.

Moreover, for instance, when detecting the recorded signal on optical disc 18, the suns of each output signal of photo detecting cells 26a, 26b, 26c and 26d are added by adders 46, 48 and 52. If these adder signals are extracted as the recorded signal, reading information recorded on optical disc 18 can be executed. Also, when operating focussing, when the positional relationship between optical disc 18 and objective lens 16 is not in the focussed state, as shown in FIGS. 5B and 5C (for light pattern defining mask 20 of FIG. 4A) or FIGS. 5E and 5F (for light pattern defining mask 20 of FIG. 4B), beam spot 28 is irradiated onto photo detector 26 by splitting it diagonally, for instance, onto photo detecting cells 26a and 26c or onto photo detecting cells 26b and 26d. Therefore, direction sensitivity is increased and thus stable focussing detection can be achieved without detection errors.

In light pattern defining mask 20, as shown in FIG. 4B, beam spots 29a and 29b and 30a and 30b rotate in opposite directions about the center of photo detector 26 to beam spots 28a and 28b. That is to say, taking beam spots 28a and 28b which are irradiated onto photo detector 26 when optical disc 18 and objective lens 16 are in focus as the standard, changes in the positional relationship between optical disc 18 and objective lens 16 can be detected. Also, there is no necessity to secure photo detector 26 at focal point position H on focal line b of the light through cylindrical lens 24. Photo detector 26 may be located before or beyond focal point position H, and photo detector 26 may be rotated so that the positions of beam spots 28a and 28b when in focus are equally divided by the d axis of photo detector 26 when irradiated onto it.

In this way, even if photo detector 26 is located before or beyond focal point position H, detection results can be obtained in the same way as when it is positioned at focal point position H. Also, even if photo detector 26 is positioned at focal position G on focal line a of the light through cylindrical lens 24, beam spots 28a and 28b irradiated on photo detector 26 are only rotated 90° at most.

Therefore, even if photo detector 26 is positioned at focal point position G, the same light detection effect can be obtained as when it is positioned at focal point position H. Also, the same detection effect can be obtained when photo detector 26 is positioned before or beyond focal point position G.

Another embodiment of the present invention will be described.

Figure 7:
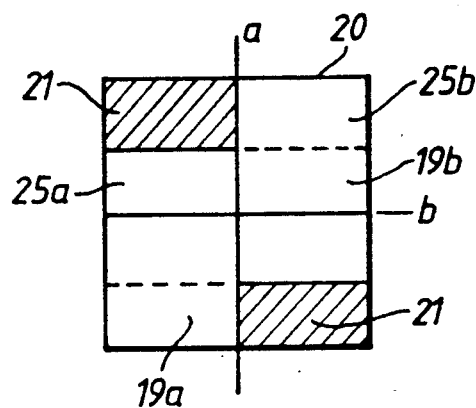
FIG. 7 is a plan view of a modification of the light pattern defining mask of FIG. 4A.

Another construction of light pattern defining mask 20 in FIG. 4A is described with reference to FIGS. 7 and 8. Using this embodiment, positioning photo detector 26 between focal point position G in the direction orthogonal to generatrix direction 23 and focal point position H in generatrix direction 23 was tried. As shown in FIG. 7, in the case of light pattern defining mask 20, light masking film 21 is located as shown. Thus, the remaining area of the light pattern defining mask 20 are light transmitting. When the light which has passed through objective lens 16 is focussed on optical disc 18, the pattern of beam spot 28 on photo detector 26 is asymmetric about the a axis of light pattern defining mask 20 of FIG. 7, and is formed by the light which is extracted in a rectangular pattern from each of the first and second areas.

Figures 8A, 8B:
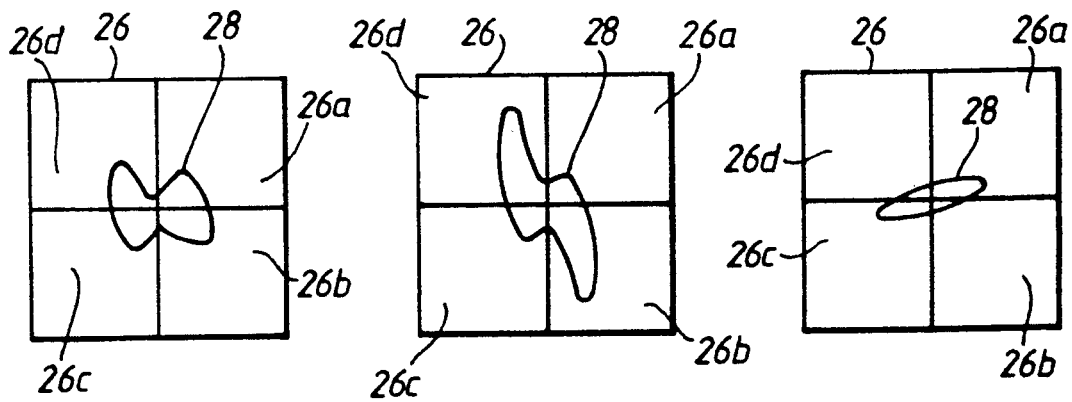
FIGS. 8A, 8B and 8C are explanatory diagrams showing the operation of the light detecting apparatus according to the light pattern defining mask of FIG. 7.

The light which has passed through the light transmitting portions of the light pattern defining mask 20 irradiates onto photo detector 26 after it is condensed in the direction orthogonal to generatrix direction 23 and before it is condensed in generatrix direction 23. As shown in FIG. 8A, the light straddles the four areas of photo detector 26 and takes a pattern symmetrical about both axis c and d which are orthogonal to each other. This pattern is produced when the lens is in the focussed state and when light pattern defining mask 20 shown in FIG. 7 is used. Photo detector 26 is rotated about the light axis so that the light quantities irradiated by beam spot 28 onto photo detector 26 at this time become equal on each of photo detecting cells 26a, 26b, 26c and 26d.

Figure 8C:

When optical disc 18 is closer to objective lens 16 than in the focussed state, as shown in FIG. 8B, the pattern of beam spot 28 becomes narrower in width in the direction of the d axis but, on the contrary, becomes longer in the direction of the c axis than when in the focussed state in FIG. 8A. Also, when optical disc 18 is farther from objective lens 16 than in the focussed state, as shown in FIG. 8C, the pattern of beam spot 28 becomes broader in width in the direction of the d axis but, on the contrary, becomes narrower in the direction of the c axis than when in the focussed state in FIG. 8A.

Figure 9:
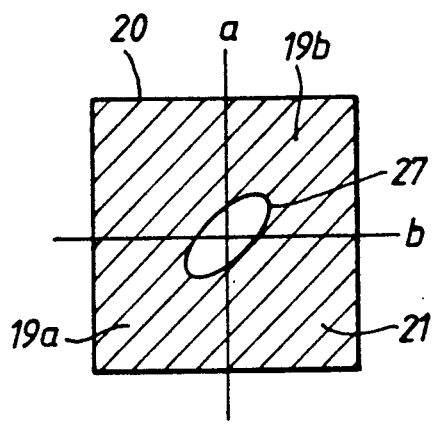
FIG. 9 is a plan view of a modification of the light pattern defining mask of FIG. 4B.

Furthermore, another construction of light pattern defining mask 20 in FIG. 1A is described with reference to FIGS. 9 and 10. In this embodiment positioning photo detector 26 at a greater distance in the direction of advance of the light than the focal point position H in generatrix direction 23 was tried. As shown in FIG. 9, in the case of light pattern defining mask 20, light masking film 21 is provided asymmetrically about the a axis and the b axis in first and second areas 19a and 19b. The pattern of light transmitting portion 27 is approximately oval-patterned and the longer axis of this oval-pattern is inclined at approximately 45° to the a axis or the b axis. Also, the point of intersection of the longer axis and the shorter axis of the oval-approximately agrees with the point of intersection of the a axis and the b axis.

Figure 10C:
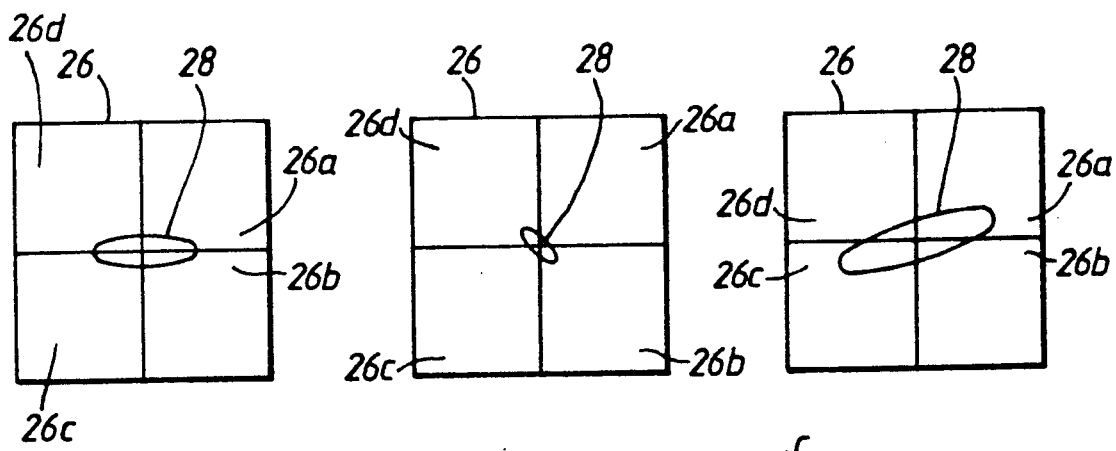
FIGS. 10A, 10B and 10C are expanatory diagrams showing the operation of the light detecting apparatus according to the light pattern defining mask of FIG. 9.
Figures 10A, 10B:
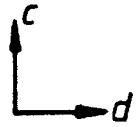

In FIG. 10, beam spot 28 irradiates more brightly inside the curved line than outside it. When the light which has passed through objective lens 16 is in the focussed state on optical disc 18, the light is symmetrical about the point of intersection of the a axis and the b axis of light pattern defining mask 20 of FIG. 9. After the light is condensed in the direction orthogonal to generatrix direction 23 it is condensed in the direction of generatrix 23, and it is then irradiated onto photo detector 26. As shown in FIG. 10A, the light is not in a focussed state and straddles photo detecting cells 26a, 26b 26c and 26d of photo detector 26, and takes an approximately oval-pattern. This pattern is determined to be the pattern when focussed. Photo detector 26 is rotated about the light axis so that the light quantities irradiated by beam spot 28 onto photo detector 26 at this time become equal on each of photo detecting cells 26a, 26b, 26c and 26d.

If optical disc 18 is closer to objective lens 16 than in the focussed state, as shown in FIG. 10B, the long axis and the short axis of beam spot 28 become shorter than when in the focussed state in FIG. 10A. Also, when optical disc 18 is farther from objective lens 16 than in the focussed state, as shown in FIG. 10C, the long axis of oval-patterned beam spot 28 inclines and, at the same time, the lengths of both the long axis and the short axis increase compared with the focussed state in FIG. 10A.

The patterns of the light transmitting portions 20e and 20f of light pattern defining mask 20 which are shown in FIG. 4B need not necessarily always be circular. For instance, they may be of any pattern, such as square or oval. Moreover, it is not necessary for the positional relaionship between light transmitting portions 20e and 20f to be symmetrical about light axis 21 as long as they are provided within the beam spot irradiated onto light pattern defining mask 20. Also, when detecting tracking signals, although the example given was set parallel to generatrix direction 23 of cylindrical lens 24, it may also be set parallel to the direction orthogonal to generatrix direction 23 of cylindrical lens 24.

As described above, even in cases when photo detector 26 is arranged before or beyond focal point position H in generatrix direction 23 when in the focussed state in FIG. 1A, the same detection effect can be obtained as in the case when photo detector 26 is arranged at focal point position H. In other words, taking the case when objective lens 16 and optical disc 18 are in the focussed position as the standard, the pattern of beam spot 28 on photo detector 26 when they are closer together or farther away from each other shifts so that detection sensitivity is increased when detecting by photo detecting cells 26a and 26c and when detecting by photo detecting cells 26b and 26d. That is to say, the signal processing in FIG. 6 can be applied even in the cases when photo detector 26 is arranged before or beyond focal point position H.

In first and second areas 19a and 19b in which light masking film 21 arranged along the direction of recording track 34 is provided on light pattern defining mask 20, light masking film 21 is provided so that it extracts uneven light quantities and, at the same time, so that first and second areas 19a and 19b extract asymmetric light quantities along the axes a and b.

In this optical device, taking the case when objective lens 16 and optical disc 18 are in the focussed position as the standard, if the relative distances between objective lens 16 and optical disc 18 are greater or smaller than when in the focussed state, the light quantities irradiated onto photo detector 26 change from photo detecting cells 26a and 26c to photo detecting cells 26b and 26d or from photo detecting cells 26b and 26d to photo detecting cells 26a and 26c. By this means, the difference of light quantity detection between photo detecting cells 26a and 26c and photo detecting cells 26b and 26d becomes greater so that stable detection can be carried out without detection errors. Also, even in the cases when the light axis L slips in the direction of recording track 34 or the direction orthogonal to the direction of recording track 34, accurate focussing detection can be carried out in this way.

In the embodiments of the present invention, a structure provided with converging lens 22 is used. However, the converging lens 22 is used for obtaining a small beam spot 28 on photo detector 26, and if photo detector 26 has sufficiently broad detection areas, this converging lens 22 is not required. Also, concerning the position in which photo detector 26 is arranged, in these embodiments it may be arranged at focal point position H or before or beyond it. However, the same effect can be obtained even when it is arranged at focal point position G or before or beyond that.

Moreover, the light from optical disc 18 is treated as reflected light, but the present invention can be applied in the same way for transmitted light. Furthermore, an axis parallel to the direction along recording track 34 is taken as the a axis and an axis orthogonal to the a axis is taken as the b axis. However, this may be an approximately orthogonal relationship. Also, an axis parallel to the a axis is taken as the c axis and an axis parallel to the b axis is taken as the d axis. However, these may be approximately parallel relationships. Furthermore, light masking film 21 is provided on light pattern defining mask 20, but light masking is not required if a component which extracts light quantities which are uneven in intensity is used.

Figure 1B:
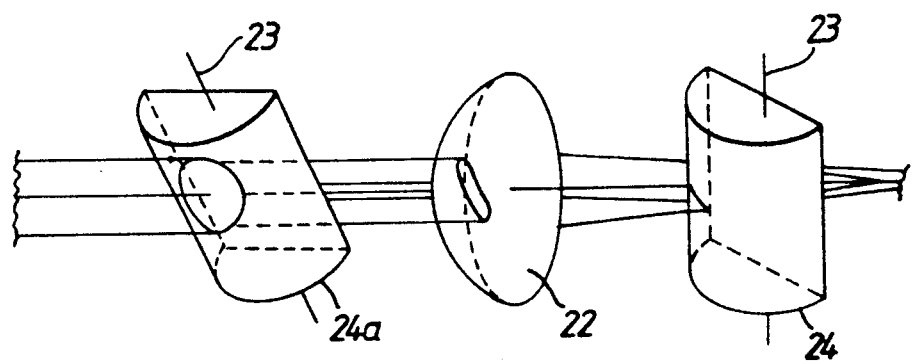
FIG. 1B is a schematic drawing partially showing a modification of FIG. 1A.

In the above embodiment, the partial light extracting element, i.e., the light pattern defining mask 20 may be replaced by another light pattern reshaping element such as a second cylindrical lens 24a, as shown in FIG. 1B. FIG. 1B shows a part of a modification of the light detecting apparatus of FIG. 1A. In FIG. 1B, the axes 23 and 23a of the first and second light pattern reshaping element, i.e., the first and second cylindrical lenses 24 and 24a are differentiated by 45° with each other.

Figure 11:
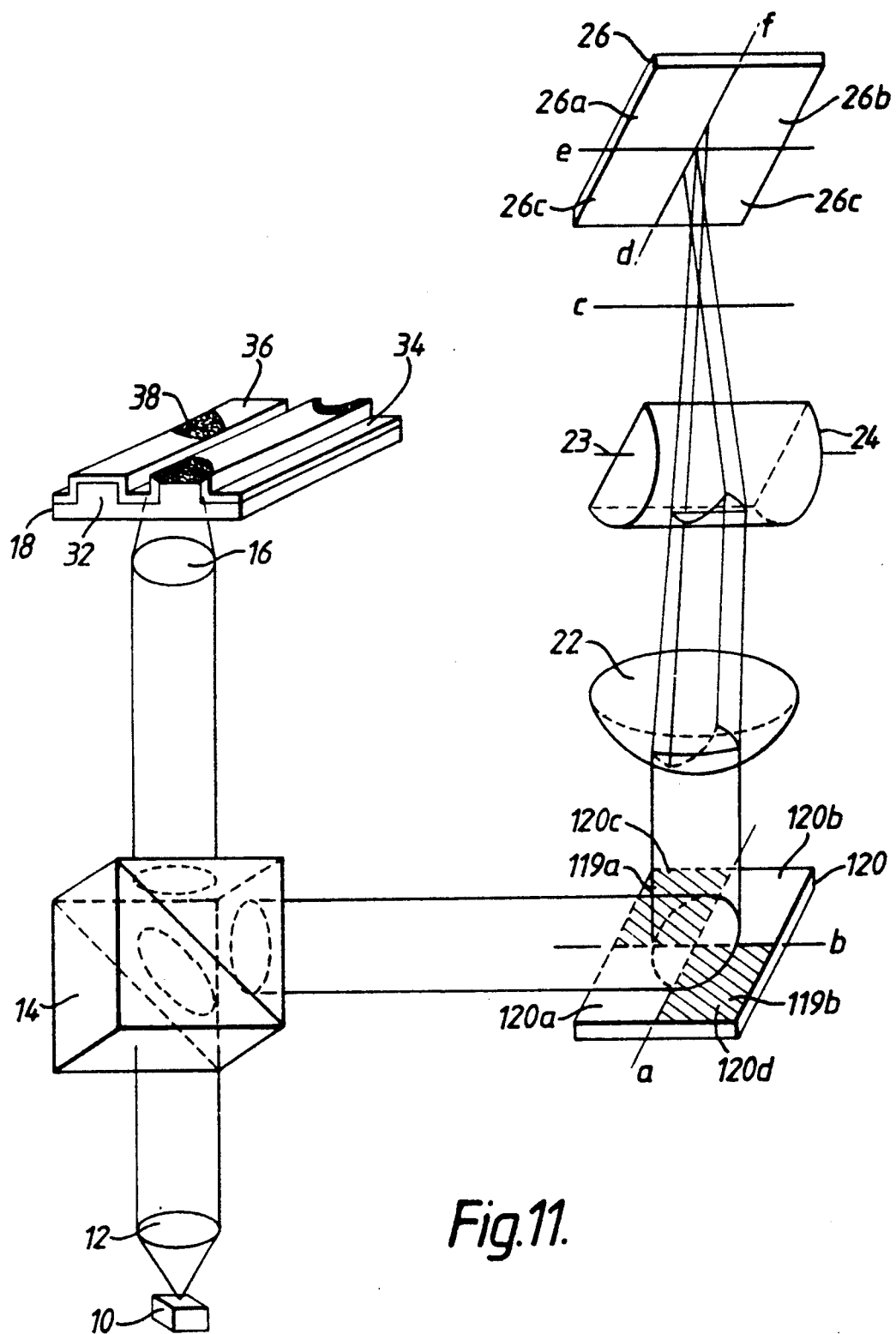
FIG. 11 is a schematic drawing showing a second embodiment of the light detecting apparatus according to the present invention.

Now, FIG. 11 shows a second embodiment of the photo detecting apparatus according to the present invention. As seen from FIG. 11, the second embodiment of the photo detecting apparatus includes a mirror 120 in place of light pattern defining mask 20 in FIG. 1A. Thus, mirror 120 reflects or varies the path of the light. The rest of the photo detecting apparatus other than mirror 120 is the same as that of the photo detecting apparatus shown in FIG. 1A. Accordingly, the construction and the operation of only the mirror 120 will be described hereinafter.

The light is reflected by the optical disc and is led towards mirror 120 by beam splitter 14. The light path is changed by mirror 120 and the light is irradiated onto photo detector 26 via converging lens 22 and cylindrical lens 24. Mirror 120 not only changes the light path, but also causes uneven distribution of that light is inclined so that the light is incident upon it at an angle of 45° to the normal of the plane of mirror 120.

Figure 12:
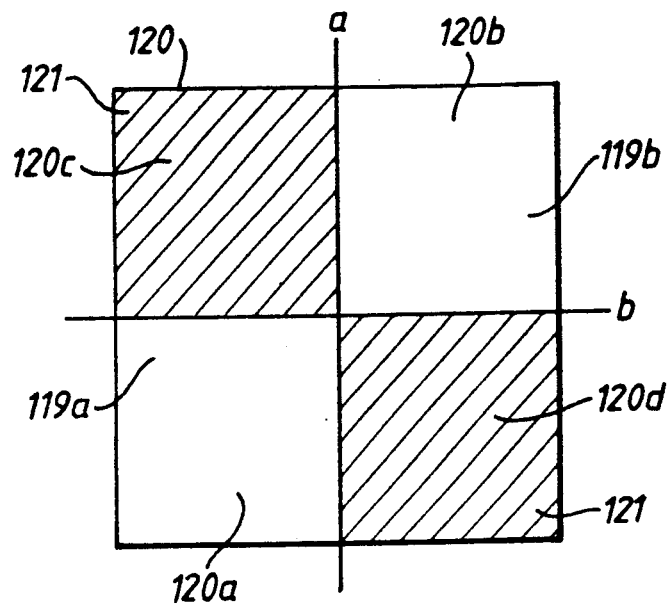
FIG. 12 is a plan view of an example of a light pattern defining mask of FIG. 11.

Mirror 120, as shown in FIG. 12, has first and second areas 119a and 119b which are arranged in the direction perpendicular to the generatrix direction 23 of cylindrical lens 24. These first and second areas 119a and 119b respectively have light masking portions 120c and 120d and reflecting portions 120a and 120b. Also, light masking portions 120c and 120d are each asymmetric about the a axis, which is in a direction parallel to the generatrix direction 23 of cylindrical lens 24, and about the b axis, which is orthogonal to the a axis, and each portion is formed in each of first and second areas 119a and 119b along the a axis. Light masking film 121 is provided on light masking portions 120c and 120d.

When the light led from beam splitter 14 is irradiated onto mirror 120 which contains light masking portions 120c and 120d as shown in FIGS. 11, the light irradiated onto reflecting portions 120a and 120b is reflected by mirror 120 and is led to converging lens 22. The light reflected by mirror 120 is processed in similar to photo detecting apparatus, as shown and described with respect to FIG. 1A.

In the above description, the light pattern reshaping element, i.e., cylindrical lens 24 is located near to photo detector 26 than the partial light extracting element, i.e., light pattern defining mask 20 (FIGS 1A, 1B) or mirror 120 (FIG. 11). However, their positions can be changed. That is, the light pattern reshaping element, i.e., cylindrical lens 24 is located far from photo detector 26 than the partial light extracting element, i.e., light pattern defining mask 20 or mirror 120.

Figure 13A:
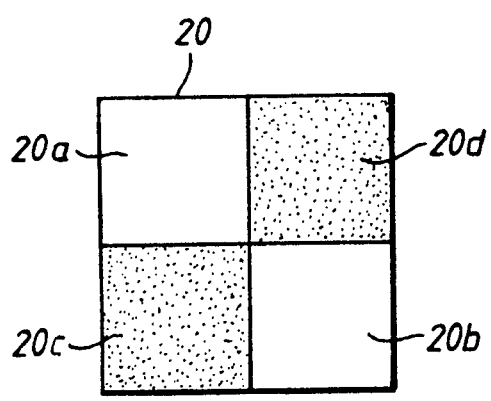
FIGS. 13A, 13B, 13C and 13D are plan views of various modification of the light pattern defining mask.
Figure 13B:
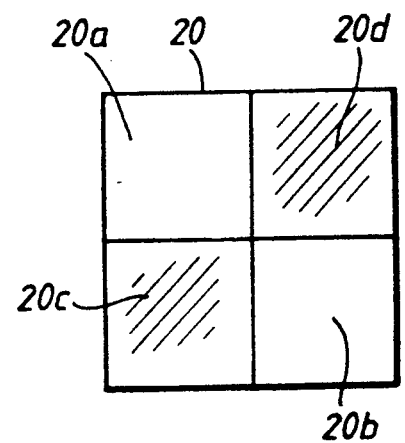
Figure 13C:
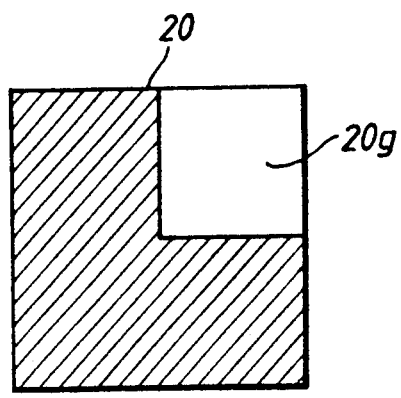
Figure 13D:
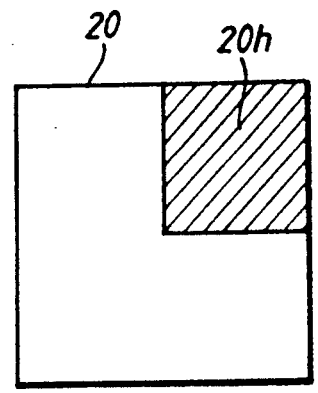

The present invention has various modifications without being limited to the above embodiments. FIGS. 13A through 13D show some examples of the various modifications of light pattern defining mask 20. In FIG. 13A, light masking portions 20c, 20d are formed by roughening so that the lights thereto are scattered and not irradiated to photo detector 26. In FIG. 13B, light masking portions 20c, 20d are prism structures for radiating the lights out of photo detector 26. In FIG. 13C, light pattern defining mask 20 has one light transmissive portion 20g. In FIG. 13D, light pattern defining mask 20 has one light masking portion 20h. Thus, light transmissive portion 20g and light masking portion 20h can make the light passing through light pattern defining mask 20 asymmetrical.

As described above, the present invention can provide an extremely preferable photo detecting apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A light detecting apparatus, comprising:
   means for receiving light travelling in a predetermined direction;
   means for extracting a portion of the received light to form a light pattern;
   means for reshaping the light pattern; and
   photo-detecting means including four photo-detecting cells arranged as quadrants of a plane, for receiving the reshaped light pattern and detecting information data from said received light pattern.

2. The light detecting apparatus of claim 1, wherein the reshaping means has a first axis disposed in the predetermined direction of the received light, the extracting means defines a preformed symmetrical pattern about the first axis, and the light pattern formed by the extracting means is asymmetrical with respect to the preformed pattern.

3. The light detecting apparatus of claim 1, wherein the reshaping means is located between the photo-detecting means and the extracting means.

4. The light detecting apparatus of claim 1, wherein the extracting means includes a light pattern defining mask which has a first portion which is light transmissive and a second portion which is not light transmissive.

5. The light detecting apparatus of claim 4, wherein the mask includes means for preventing a reflection of light toward a source of the received light.

6. The light detecting apparatus of claim 5, wherein the preventing means includes a light absorbing material.

7. The light detecting apparatus of claim 4, wherein the light pattern defining mask defines a plane which is inclined with respect to the predetermined direction of the received light.

8. The light detecting apparatus of claim 1, wherein the extracting means includes a mirror with a first portion which is light reflective and a second portion which is not light reflective.

9. A light detecting apparatus, comprising:
   means for receiving light travelling along a predetermined axis;
   first means for shaping the received light including extracting means for extracting a portion of the received light to form a first light pattern symmetrical about the predetermined axis;
   second means for reshaping the first light pattern into a second light pattern asymmetrical with respect to the first light pattern; and
   photo-detecting means including four photo-detecting cells arranged as quadrants of a plane, for receiving the reshaped second light pattern and detecting information data from said received light pattern.

10. The light detecting apparatus of claim 9, wherein the second reshaping means is located between the photo-detecting means and the first reshaping means.

11. The light detecting apparatus of claim 9, wherein the second reshaping means includes a first anisotropic lens.

12. The light detecting apparatus of claim 11, wherein the first reshaping means includes a light pattern defining mask which has a first portion which is light transmissive and a second portion which is not light transmissive.

13. The light detecting apparatus of claim 12, wherein the mask includes means for preventing a reflection of light toward a source of the received light.

14. The light detecting apparatus of claim 13, wherein the preventing means includes a light absorbing material.

15. The light detecting apparatus of claim 12, wherein the plane of the light pattern defining mask is inclined to the light axis of the received light.

16. The light detecting apparatus of claim 11, wherein the first reshaping means includes a mirror with a first portion which is light reflective and a second portion which is not light reflective.

17. The light detecting apparatus of claim 11, wherein the first reshaping means includes a second anisotropic lens.

18. The light detecting apparatus of claim 17, wherein the first and second anisotropic lenses include cylindrical lenses.

19. A light detecting apparatus, comprising:
   means for receiving light travelling along an axis;
   means for extracting a portion of said received light, said extracting means defining a plane generally orthogonal to said axis having quadrants disposed in a symmetrical preformed pattern about said axis, forming a light pattern asymmetrical with respect to the preformed pattern;

means for reshaping the light pattern; and photo-detecting means including four photo-detecting cells disposed to form quadrants of a plane, said plane being disposed generally orthogonal to said axis, for receiving the reshaped light pattern and detecting information data from said received light pattern.

20. The light detecting apparatus of claim 19, wherein the light pattern received by the photo-detecting means is symmetrical about the axis penetrating the plane at times when the received light is in focus.

21. The light detecting apparatus of claim 19, wherein the light pattern received by the photo-detecting means is asymmetrical about the axis penetrating the plane at times when the received light is out of focus.

22. A light detecting apparatus, comprising:

mean for receiving light travelling along an axis;

first means for shaping the received light including a first anisotropic cylindrical lens, including means for forming the light into a first light pattern which is symmetrical about the axis;

second means for reshaping the first light pattern into a second light pattern asymmetrical with respect to the first light pattern, including a second anisotropic cylindrical lens; and photo-detecting means including four generally rectangular photo-detecting cells arranged to form a rectangle, for receiving the reshaped second light pattern and detecting information data from said received light pattern.

23. A light detecting apparatus, comprising:

means for receiving light traveling along an axis;

means for extracting a portion of said received light, said extracting means defining a plane generally orthogonal to said axis having quadrants disposed in a symmetrical preformed pattern about said axis, forming a light pattern asymmetrical with respect to the preformed pattern;

means for reshaping the light pattern; and photo-detecting means for receiving the reshaped light pattern and extracting information from said received light pattern, defining a plane orthogonal to the axis, including four photosensitive quadrants arranged so that the received light pattern forms a symmetrical pattern on two opposing quadrants with respect to the axis at times when the light is in focus, and an asymmetrical pattern on at least one quadrant at times when the light is out of focus.

* * * * *